May 21, 1968 YASUTAKA KAWASE ET AL 3,383,981
PHOTOELECTRIC EXPOSURE METER

Filed April 11, 1963 4 Sheets-Sheet 1

Inventors
Yasutaka Kawase
Shogoro Yamamoto
By Stevens, Davis, Miller & Mosher
Attorneys Inventors
Yasutaka Kawase
Shogoro Yamamoto
By Stevens, Davis, Miller & Mosher
Attorneys May 21, 1968 YASUTAKA KAWASE ET AL 3,383,981
PHOTOELECTRIC EXPOSURE METER
Filed April 11, 1963 4 Sheets-Sheet 4
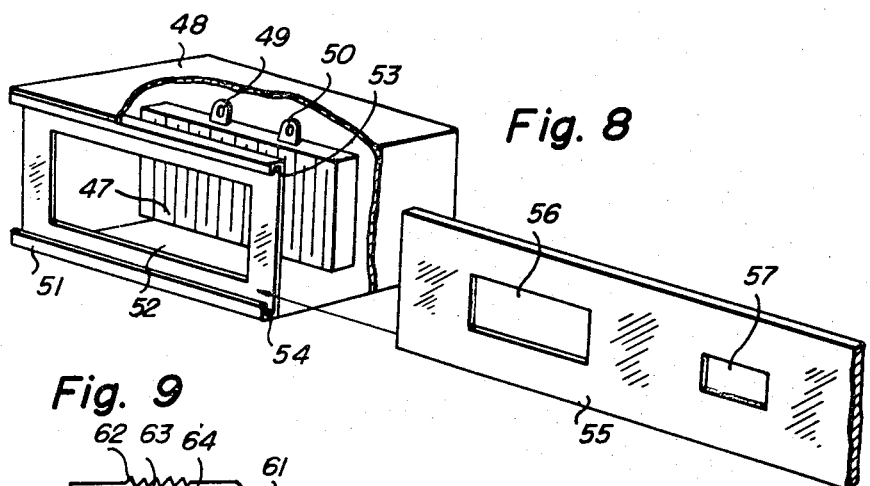
Fig. 8
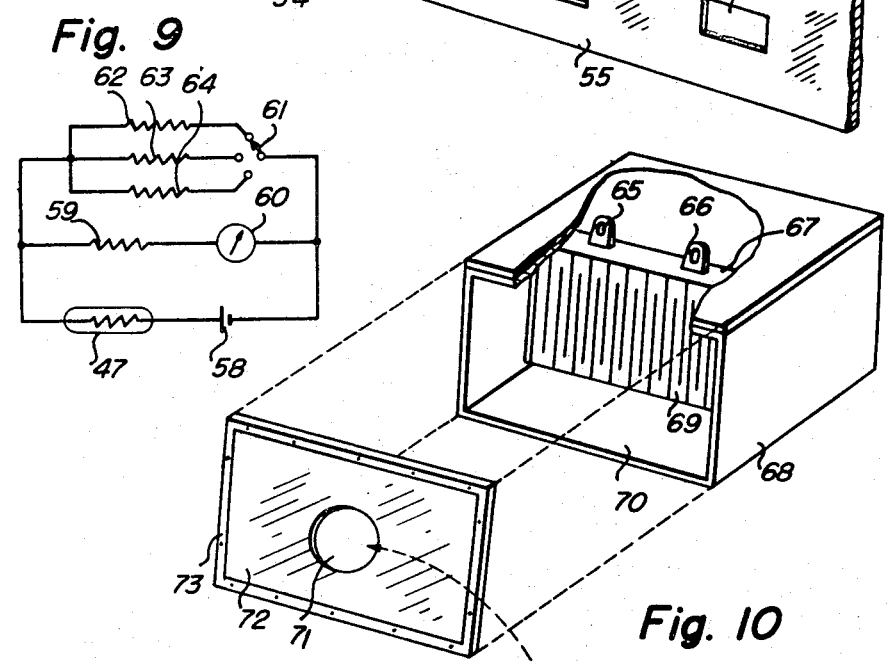
Fig. 9
Fig. 10
Inventors
Yasutaka Kawase
Shogoro Yamamoto
By Stevens Davis, Miller & Mosher
Attorneys United States Patent Office 3,383,981
Patented May 21, 1968

3,383,981
PHOTOELECTRIC EXPOSURE METER
Yasutaka Kawase, Osaka, and Shogoro Yamamoto, Kaizuka-shi, Japan, assignors to Matsushita Electronic Corporation, Osaka, Japan, a corporation of Japan
Filed Apr. 11, 1963, Ser. No. 272,286
Claims priority, application Japan, May 30, 1962, 37/22,394; June 14, 1962, 37/32,213; Sept. 8, 1962, 37/38,818
5 Claims. (Cl. 88—23)

ABSTRACT OF THE DISCLOSURE

An exposure meter having front and back light-interceptor plates each of which is provided with two openings. The plates are arranged in close relation to each other so that the four openings form two apertures, one for the light-measuring system and the other for the view finder system. The sizes of the apertures vary according to the opposing sliding movement of the two plates. Measuring errors, arising from variations in the light-receiving area and the internal resistance of the photoconductive element in the light measuring system due to the size variation of the aperture, are compensated for electrically and by the relative gradation of the shutter speed dial and the diaphragm aperture dial.

---

The present invention relates to exposure meters and provides an exposure meter arranged to have a field of vision for measurement which is variable as desired so as to give a proper exposure value not only for the entire subject or scene to be photographed but for any particular part thereof.

Generally with conventional exposure meters, the field of vision for measurement is fixed and therefore, for example, when employed for a scene including a combination of the moon and a human object, the exposure meter only gives a proper exposure value corresponding to the average of the respective brightnesses of the moon, the human object and the background. Therefore, a picture taken upon the basis of such exposure value will be unsatisfactory over the entire field with the moon area overexposed and the area of the human object under-exposed.

To eliminate such difficulty previously met, according to the present invention, an exposure meter is designed to give a proper exposure value for any selected part of the field of vision, for example in the above case, for the moon or the human object lighted by the moon.

The present invention will now be described with reference to the accompanying drawings, which illustrate a few embodiments of the invention and in which:

FIGS. 8 and 10 are diagrammatic perspective views of further embodiments of the invention; and FIG. 9 is a wiring diagram of the electric circuit of the embodiments shown in FIGS. 8 and 10.

Figure 7:
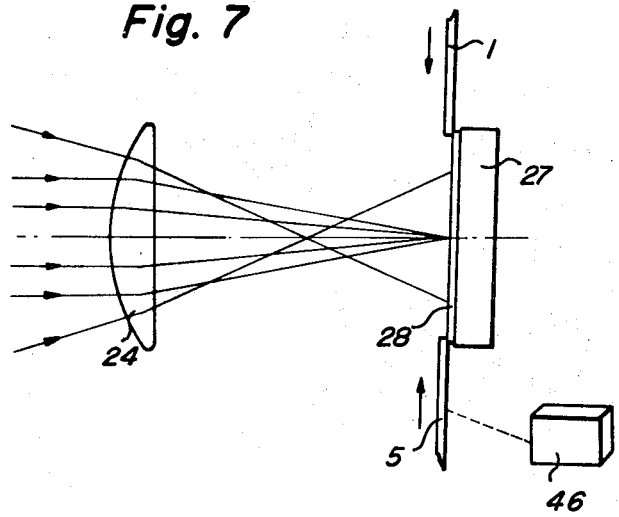
FIG. 7 is an explanatory diagram illustrating the principle of the invention.

At the first, the principle upon which the present invention is based will be set forth with reference to FIG. 7.

In operation of the exposure meter of the invention, the photoconductive element 27 is first placed with its photosensitive surface 28 facing toward the subject so that the light from the subject may be focused by a convex lens 24 on the photo-sensitive surface 28 or an imaginary plane in front thereof. Then, an undesired part of the entire field of vision as viewed through a view finder, that is, that part of the subject to be excluded from the field of vision for which a proper exposure value is to be found, is determined. For example, for a subject including a combination of the moon and a human object, if a proper exposure value is wanted primarily for the human object, that part of the subject including the moon and its background is excluded. To this end, a mechanism for controlling the field of vision to be measured is provided which includes a combination of a front light-interceptor plate 1 and a back light-interceptor plate 5. The light interception in effect reduces the photosensitive surface 28 of the photoconductive element 27 so that the corresponding increase in the internal resistance of the photoconductive element 27 is compensated for by compensator means 46 operatively connected with the field controlling mechanism independently of the brightness of that part of the subject to be measured.

Figure 1:
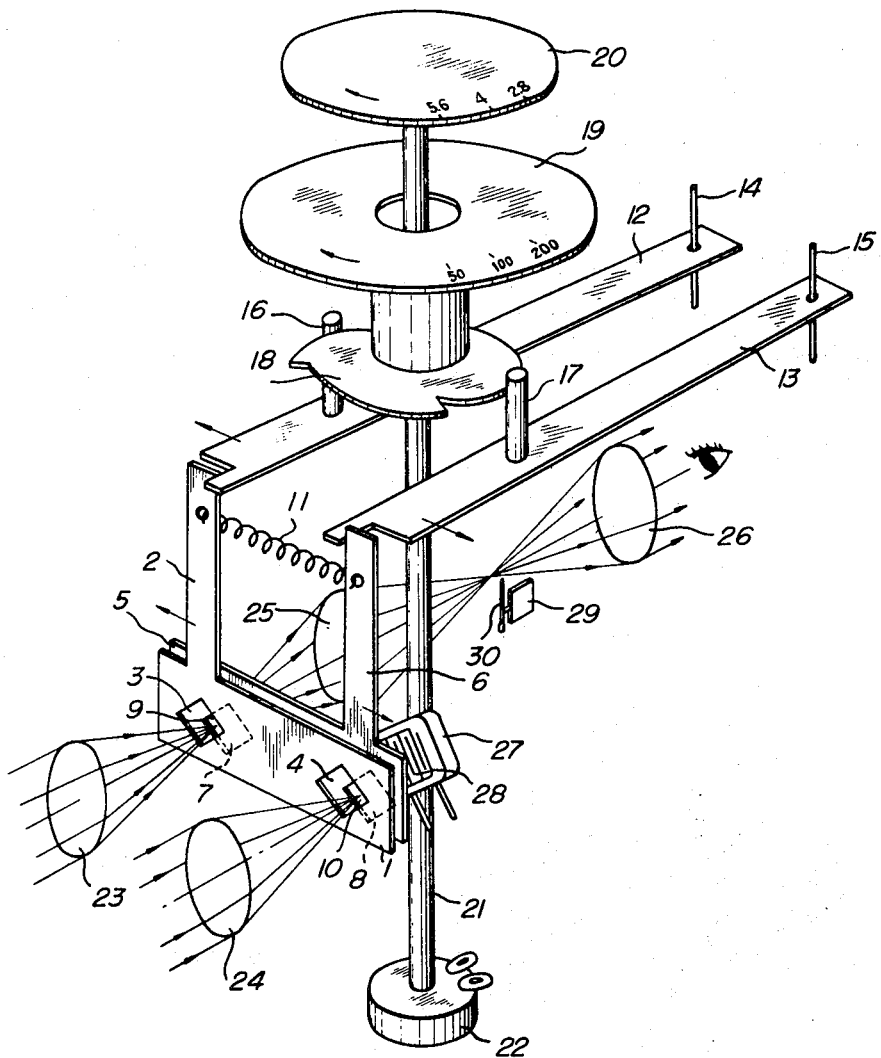
FIG. 1 is a diagrammatic perspective view showing the arrangement of the essential parts of an exposure meter embodying the invention.

Referring next to FIG. 1, the embodiment illustrated includes a front light-interceptor plate or screen 1 having an upwardly extending lug 2 and spaced openings 3 and 4, and a back light-interceptor plate or screen 5 arranged in close contact with the back surface of the front screen 1 and of the same configuration as the latter, the back light screen 5 also having an upwardly extending lug 6 and spaced openings 7 and 8. The openings 3 and 7 cooperate to form an aperture 9 while the openings 4 and 8 cooperate to form an aperture 10. The areas of the respective apertures 9 and 10 are continuously variable at the same rate by the relative sliding movement of the front and back screens 1 and 5 in the lateral direction.

A tension spring 11 is arranged between the legs 2 and 6 of the respective screens 1 and 5. A pair of laterally spaced blades 12 and 13 are pivotally supported at one end by respective posts 14 and 15 and are held in engagement with the inner edges of the respective lugs 2 and 6. The blades 12 and 13 have secured thereto respective pins 16 and 17 which extend upwardly from the top of the respective blades to cooperate with a cam disc 18, which is integral with a dial 19 carrying a scale of shutter speed or exposure time. As is readily understood, when the shutter speed dial 19 is rotated in the direction of the arrow, the pins 16 and 17 as shown are moved away from each other so that the free extremities of the pivotal blades 12 and 13 are moved laterally outwardly together with the respective screens 1 and 5 against the bias of the spring 11 to reduce the areas of the apertures simultaneously. A dial 20 carrying a scale of diaphragm aperture is mounted on a support rod 21 which extends coaxially through the shutter speed dial and cam disc assembly and carries the movable part of a variable resistor 22.

A pair of convex lenses 23 and 24 are arranged in front of the respective apertures 9 and 10 so as to focus the light from the subject at points in alignment with the axes of the respective apertures 9 and 10. Another pair of convex lenses 25 and 26 are arranged opposite to each other rearwardly of the aperture 9 at a required spacing therefrom. Arranged rearwardly of the aperture 10 is a photoconductive element 27 having a light-sensitive surface 28. A galvanometer 29 is positioned intermediate the convex lenses 25 and 26 and has a pointer 30.

With this arrangement, the convex lenses 26 and 25, aperture 9 and convex lens 23 in alignment with each other to form an optical system serving as a view finder for indicating the field of vision to be measured. The observer will see in the finder an erect image of the entire subject or its part as well as the pointer 30 of the galvanometer 29, as will readily be understood.

In use of the exposure meter with such finder system incorporated, for example for a subject including a combination of the moon and a human object, a proper exposure value may be obtained primarily for the human object lighted by the moon by turning the shutter speed dial 19 in the direction of the arrow while viewing through the finder described above to reduce the opening of the aperture 9 until the field of vision of the finder includes only the human object.

It is noted that the area of the other aperture 10 is reduced at the same time as that of aperture 9 so that an image of the human object alone is formed on the imaginary plane of the aperture 10. Accordingly, the amount of light flux falling upon the light-sensitive surface 28 of the photoconductive element 27 corresponds exclusively to the brightness of that part of the subject which includes the human object irrespective of the brightness of the remaining part of the subject.

Assume that the subject had a uniform brightness throughout and that area of the light-sensitive surface of the photoconductive element upon which light impinges through the convex lens 24 is in effect reduced to one half by the adjustment of the shutter speed dial 19. The internal resistance of the photoconductive element 27 would then be nearly doubled, and this resistance increase must be compensated for by proper means.

According to the present invention, such compensation is effected in association with the relative sliding movement of the light screens. For example, in the embodiment illustrated in FIG. 1, such compensation is effected by gradating the scales on the shutter speed dial 19 and diaphragm aperture dial 20 with respect to each other.

The principle of this compensation will now be described in connection with a bridge circuit shown in FIG. 2. A variable resistance 31 is provided for compensation for variations in the performance characteristics of the photoconductive element 27 itself. 32 designates a fixed resistance and 33 a battery. Other elements carry reference numerals like those of corresponding parts in FIG. 1.

In this bridge circuit, if the aperture 10 shown fully opened in front of the photoconductive element 27 is reduced, the circuit equilibrium will be destroyed to deflect the pointer 30 of the galvanometer 29. The variable resistor 22 is then adjusted to increase its resistance value until the pointer 30 of the galvanometer is restored to its normal zero position. As described hereinbefore, the variable resistor 22 is connected directly with the diaphragm aperture dial 20, and the shutter speed dial 19 has now been operated in association with the reduction of the aperture 10. Therefore, it will be appreciated that a proper exposure value may be obtained irrespective of the reduction in area of the field of vision to be measured as long as the scales on the dials 20 and 19 are gradated or calibrated with respect to each other taking into account the extent as determined beforehand experimentally to which the scales are to be modified in accordance with the amount of compensation to be effected for each setting of the field controlling mechanism. In this case, a proper exposure value can be obtained primarily for that part of the subject which includes only the human object lighted by the moon, the moon being excluded from the field of vision.

Figure 2:
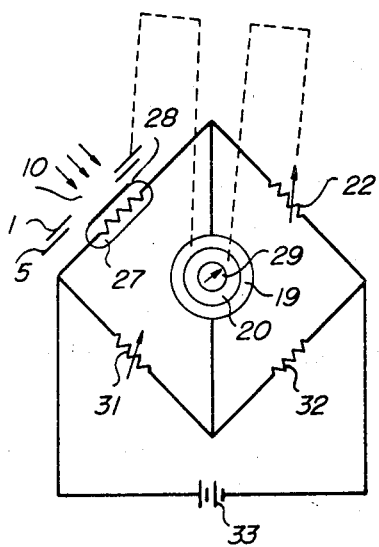
FIG. 2 is a wiring diagram of the electric circuit of the embodiment shown in FIG. 1.
Figure 3:
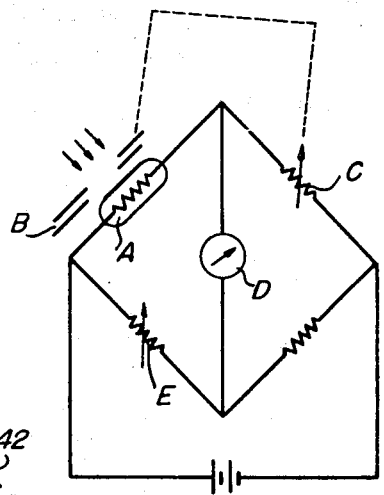
FIGS. 3 and 4 are wiring diagrams of respective modifications of the circuit shown in FIG. 2.

Although with the arrangement of FIG. 2 the decrease in the light flux impinging upon the light-sensitive surface 28 of the photoconductive element 27 due to the reduction in the field of vision to be measured is compensated for by gradating the scales on the diaphragm aperture dial 20 and shutter speed dial 19 with respect to each other as described above, the compensation may also be obtained by use of a circuit as shown in FIG. 3.

In this case, the relative arrangement of the scales on the two dials 19 and 20 is the same as that of ordinary exposure meters but a movable light screen B arranged over the light-sensitive surface of the photoconductive element A is directly connected with the movable part of a variable resistor C arranged in the ratio arm with respect to the photoconductive element A, as shown. Therefore, even if the internal resistance of the photoconductive element A is increased irrespective of the light flux by the adjustment of the movable light screen B, the variable resistance C is simultaneously increased to eliminate any effect of the increase in the internal resistance of the element A upon the deflection of the galvanometer D. A proper exposure value for any particular part of the subject may thus be determined simply by adjusting the variable resistor E so as to restore the galvanometer D to its normal zero position.

It will be appreciated that, with these embodiments, which employ a bridge circuit, even if the battery voltage drops or fluctuates, the ratio between the respective resistance values when the pointer of the galvanometer is positioned at zero remains constant, and the so-called polarization voltage applied upon the photoconductive element 27 also remains substantially unchanged even when the subject has a high brightness, thus providing for stable operation of the circuit.

Figure 4:
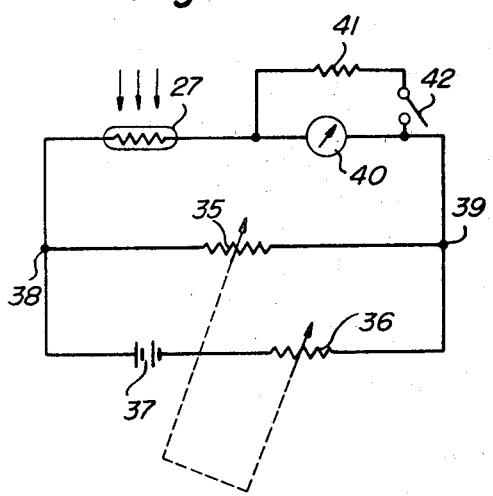

Such compensation may also be attained by use of a circuit as shown in FIG. 4, in which the polarization voltage being applied upon the photoconductive element is controlled.

In FIG. 4, variable resistors 35 and 36 are connected in series with a battery 37. An ammeter 40 calibrated on a proper exposure scale and a photoconductive element 27 are arranged in series with each other and between the opposite terminals 38 and 39 of the variable resistor 35. A resistance 41 is connected in parallel with the ammeter 40 by way of a switch 42.

The variable resistors 35 and 36 are of the two-step type, connected in opposite polarities and operatively associated with a field controlling mechanism not shown, which is arranged forwardly of the photoconductive element 27 and corresponds to one comprising the combination of front and back light screens 1 and 5 shown in FIG. 1.

In operation of this arrangement, when the light-sensitive surface of the photoconductive element 27 is in effect reduced, the resistance value of the variable resistor 35 is increased while that of the variable resistor 36 is decreased. As a result, the voltage across the opposite terminals 38 and 39 of the variable resistor and hence the polarization voltage across the photoconductive element 27 are increased to compensate for the decrease in the photoelectric current flowing therethrough, which corresponds to the reduction in the light flux impinging upon the light-sensitive surface 28 caused by the reduction in the field of vision to be measured. The switch 42 and the resistance 41 provides two ranges of measurement, as will readily be understood.

Figure 5:
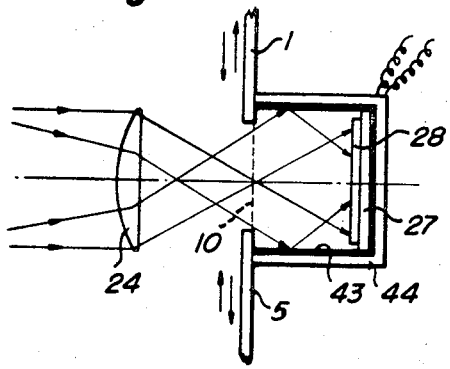
FIGS. 5 and 6 are diagrammatic side elevations of respective forms of light receiving section usable with the inventive exposure meter.

In the embodiment shown in FIG. 1, the light flux from the subject is not focused directly upon the light-sensitive surface 28 of the photoconductive element 27 but impinges upon the surface 28 after being focused in the imaginary plane of the aperture 10. However, the photoconductive element 27 may if desired be surrounded by a casing 44 lined with a reflector 43, as shown in FIG. 5, so that the entire flux passing through the aperture may impinge upon the light-sensitive surface 28 without being focused. By this arrangement, the flux being effectively prevented from being scattered is efficiently utilized. In addition, the above indirect light incidence effectively protects the light-sensitive surface 28 from the burning effect of any intense light source such as the sun even when it is included in the subject.

Figure 6:
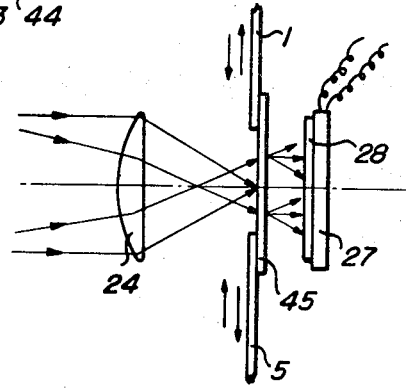

Another arrangement effective to prevent the burning of the light-sensitive surface is illustrated in FIG. 6, in which the light flux from the subject is first focused on a dispersing plate 45 and then radiated therefrom to the light-sensitive surface 28 of the photoconductive element 27. On this occasion, the dispersing plate 45 preferably takes the form of a frosted glass sheet. With this arrangement, not only the light-sensitive surface 28 is protected from the burning action but the photoconductive element 27 can operate effectively owing to the light dispersing effect of the dispersing plate 45 even if the effective area of the light-sensitive surface is small compared with the size of the image focused.

Having described a few embodiments in which the field of vision to be measured may be continuously varied, it is to be understood that such variation of the field can also be effected stepwise.

The stepwise control of the field is particularly suited for cameras having a built-in exposure meter and so-called electric eye (E.E.) cameras. Some embodiments of the invention having such stepwise field control incorporated will be described below with reference to FIGS. 8 to 10, which includes a three-step field control.

Referring first to FIG. 8, a photoconductive element 47 is arranged in a closed box 48 and has connecting terminals 49 and 50. The box 48 is closed at the front by a frame plate 51 formed with an aperture 52 centrally thereof.

The frame plate 51 is formed along the top and bottom edges thereof with a pair of guide grooves 53 and 54. A light screen 55 is formed of opaque or translucent material and has a larger aperture 56 and a smaller aperture 57 formed in spaced relation to each other. The light screen 55 is adapted to slide longitudinally in the guide grooves 53 and 54. The size of the larger aperture 56 is determined so that the entire scene to be photographed may be focused by the lens system to form a full image on the light-sensitive surface of the photoconductive element 47 or on an imaginary plane in front of the element. The photoconductive element 47 together with a battery 58, resistance 59 and ammeter 60 forms a series circuit. Resistances 62, 63 and 64 are connectible one at each time in parallel to the resistance 59 and ammeter 60 by a changeover switch 61. The changeover of the switch 61 is effected automatically in association with the stepwise movement of the light screen 55.

The aperture 52 in the frame plate 48 may be utilized in three ways; firstly, it may be used without insertion of the light screen 55; secondly, it may be replaced by the larger aperture 56 in the light screen 55 as inserted between the guide grooves 53 and 54; and thirdly, it may be replaced by the smaller aperture 57 in such light screen 55.

With this arrangement, if a proper exposure value is to be found primarily for a part of the subject described hereinbefore such as a human object lighted by the moon, the aperture 52 is replaced, for example, by the larger aperture 56 in the light screen 55 so as to include only the human object in the field of vision.

The replacing operation also effects the changeover of the switch 61 from the resistance 62 to the resistance 63, which is larger than the resistance 62. The increase in the shunt resistance parallel to the ammeter 60 effectively compensates for the increase in the internal resistance of the photoconductive element 47 due to the partial light interception of the light screen 55 and irrespective to the brightness of the subject, and thus the ammeter is kept unaffected by such increase in the internal resistance of the element. If the larger aperture 56 is replaced by the smaller aperture 57 to further reduce the field of vision to be measured, the resistance 63 is simultaneously replaced by the resistance 54, which is still larger than the resistance 53, to effect the compensation required by such reduction in the field of vision to be measured.

Another embodiment shown in FIG. 10 is designed to exclude any undesirable source of light from the field of vision in addition to the exclusion of the peripheral portion thereof. As illustrated, a photoconductive element 67 having terminals 65 and 66 is set in a closed box 68 with the light-sensitive surface 69 of the element facing forwardly. The box 68 is closed at the open front 70 by a frame plate 73 with a translucent plate 72 bonded to the plate over the entire surface thereof excepting that portion corresponding to a central aperture 71 formed in the plate 72.

Translucent inserts 74 and 75 are provided which are each formed of the same material as the translucent plate 72 and in substantially the same shape as the central aperture 71. One of the inserts 75 is formed with a through aperture 76.

As illustrated, these inserts 74 and 75 are carried by respective support levers 78 and 79 pivotally mounted on a common pivot shaft 77 and thus can be selectively brought to the front side of the translucent plate 72 and into alignment with the aperture 71 therein.

The circuit arrangement for the photoconductive element 67 is similar to one shown in FIG. 9 except that the changeover switch 61 is operated in association with the selective pivotal movement of the inserts 74 and 75 to the front side of the aperture 71.

With the embodiment illustrated in FIG. 10, the field of vision to be measured is limited by the aperture 71 when neither insert 74 nor 75 is positioned in front of the aperture 71, and by the aperture 76 in the insert 75 when it is positioned in front of the aperture 71, but is fully admitted when the insert 74 is placed in front of the aperture 74. In this case, a proper exposure value which is not so unnatural to the entire subject can be determined by properly selecting the translucency of the plate 72 so as to emphasize the brightness of the selected portion of the subject while allowing the brightness of the remaining portion of the subject to be more or less reflected.

Having described several preferred embodiments of the invention, it is to be understood that it is not to be limited to the details set forth but various changes and modifications can be made without departing from the scope and spirit of the invention as claimed.

We claim:

1. A photoelectric exposure meter comprising front and rear light-interceptor plates juxtapositioned with said rear plate being in close contact with the back surface of said front light-interceptor plate, said plates being substantially identical with each having two spaced openings therein, sliding means operatively connected to move said light-interceptor plates relative to each other, a first aperture formed by the cooperation of one of said openings in each of said plates, a photoconductive element disposed spaced rearwardly of said plates in axial alignment with said first aperture along a light path passing therethrough, a second aperture formed by the other openings in each of said plates, view finder means including said second aperture, a shutter speed control dial operatively connected to said sliding means, a diaphragm aperture control dial coaxial with said shutter speed control dial, an electric circuit including the photoconductive element, a galvanometer, having an indicator visible in the view finder, and compensator means to compensate for a variation of the light measurement due to a change in the internal resistance of said photoconductive element which results from a change in the effective light-sensitive area of said photoconductive element caused by the relative movement of said plates, said compensator means including a variable resistor coupling means operatively connecting said variable resistor to said diaphragm aperture control dial to move in relation to the sliding movement of said sliding means whereby restoration of said galvanometer to a zero position will effect proper aperture setting.

2. A photoelectric exposure meter according to claim 1, in which said electric circuit includes a bridge circuit, and said compensator means is provided with coupling means arranged intermediate a variable resistance arranged in said bridge circuit in the ratio arm with respect to one arm to which said photoconductive element is connected and said sliding means.

3. A photoelectric exposure meter according to claim 1, in which said electric circuit is composed of said photoconductive element and said galvanometer connected in series, two variable resistances connected to said photoconductive element and said galvanometer in parallel thereto, and said compensator means is provided with means to connect said two variable resistances such that their resistances are changed with opposite polarities.

4. A photoelectric exposure meter according to claim 1, in which said apertures are substantially rectangular, means to cause said front light-interceptor plate and back light-interceptor plate to slide in such a manner that said first and second apertures are maintained rectangular.

5. A photoelectric exposure meter according to claim 1 in which said compensator means further includes dial gradation between said shutter speed dial and the diaphragm aperture dial.

References Cited

UNITED STATES PATENTS

| | | | |
|---|---|---|---|
| 2,143,500 | 1/1939 | Smethurst et al. | 88—23 |
| 2,879,691 | 3/1959 | Faulhaber | 88—23 |

JEWELL H. PEDERSEN, *Primary Examiner.*

W. L. SIKES, *Assistant Examiner.*